US012563129B2

(12) United States Patent
Lagwankar et al.

(10) Patent No.: US 12,563,129 B2
(45) Date of Patent: Feb. 24, 2026

(54) SYSTEMS AND METHODS FOR PREFETCHING AND TRANSMITTING INTERMEDIARY CONTENT TO USER DEVICES

(71) Applicant: Warner Bros. Discovery, Inc., New York, NY (US)

(72) Inventors: Kunal Lagwankar, Short Hills, NJ (US); Anshu Dwivedi, Pune (IN); Srujan Polina, Pune (IN); Shubha Gopalakrishna, Bangalore (IN); Sumit Bhardwaj, Pune (IN); Gaurav Sharma, Gurugram (IN); Lakshmi Nrusimhan, Bangalore (IN); Aman Kashyap, Udaipur (IN); Ankit Singh, Gorakhpur (IN); Akshay Katole, Pune (IN)

(73) Assignee: Warner Bros. Discovery, Inc., New York, NY (US)

( * ) Notice: Subject to any disclaimer, the term of this patent is extended or adjusted under 35 U.S.C. 154(b) by 0 days.

(21) Appl. No.: 18/645,680

(22) Filed: Apr. 25, 2024

(65) Prior Publication Data

US 2025/0233929 A1 Jul. 17, 2025

(30) Foreign Application Priority Data

Jan. 12, 2024 (IN) .............................. 202411002357

(51) Int. Cl.
*H04L 67/5681* (2022.01)
*H04L 65/60* (2022.01)
*H04L 67/50* (2022.01)

(52) U.S. Cl.
CPC .......... *H04L 67/5681* (2022.05); *H04L 65/60* (2013.01); *H04L 67/535* (2022.05)

(58) Field of Classification Search
CPC .............. G06Q 30/0269; H04N 21/812; H04L 67/5681
See application file for complete search history.

(56) References Cited

U.S. PATENT DOCUMENTS

| | | | | |
|---|---|---|---|---|
| 9,055,348 B1 * | 6/2015 | Kerns | .............. | H04N 21/25891 |
| 9,661,374 B1 * | 5/2017 | Erdmann | ......... | H04N 21/41407 |
| 2018/0007447 A1 * | 1/2018 | McLean | ........... | H04N 21/23418 |

(Continued)

OTHER PUBLICATIONS

International Search Report issued in International Application No. PCT/US2025/010881 dated Mar. 4, 2025 (12 pages).

*Primary Examiner* — Caroline H Jahnige
(74) *Attorney, Agent, or Firm* — Bookoff McAndrews, PLLC

(57) ABSTRACT

A method of transmitting intermediary content to a user device may include receiving a periodic signal from the user device. The periodic signal may indicate an activity status of the user device. In response to receiving the periodic signal, the method may further include updating a user map with the activity status of the user device. The method may further include receiving a request to transmit intermediary content to the user device. In response to receiving the request to transmit intermediary content, the method may further include determining that the activity status of the user device in the user map is an active status. The method may further include transmitting a set of cached intermediary content to the user device.

18 Claims, 6 Drawing Sheets

(56)                    References Cited

U.S. PATENT DOCUMENTS

| | | | | |
|---|---|---|---|---|
| 2018/0218400 A1* | 8/2018 | Kerns | ................ | G06Q 30/0256 |
| 2018/0271410 A1* | 9/2018 | Rawal | .................. | A61B 5/0022 |
| 2018/0292890 A1* | 10/2018 | Swanson | .............. | G06F 3/0346 |
| 2021/0044842 A1 | 2/2021 | Chauhan et al. | | |
| 2021/0329090 A1 | 10/2021 | Yellin et al. | | |
| 2021/0329091 A1 | 10/2021 | Yellin et al. | | |

* cited by examiner

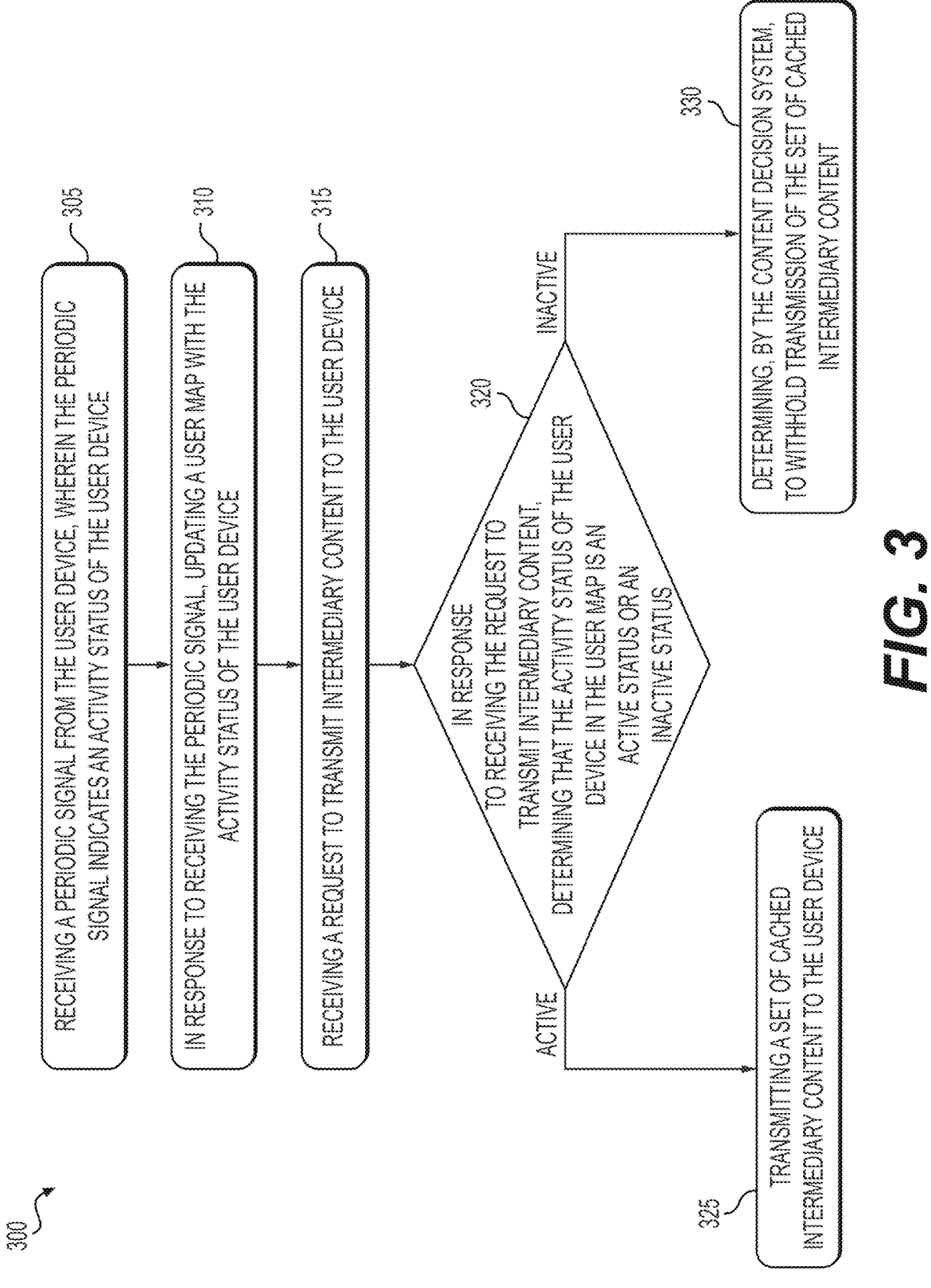

305 — RECEIVING A PERIODIC SIGNAL FROM THE USER DEVICE, WHEREIN THE PERIODIC SIGNAL INDICATES AN ACTIVITY STATUS OF THE USER DEVICE

310 — IN RESPONSE TO RECEIVING THE PERIODIC SIGNAL, UPDATING A USER MAP WITH THE ACTIVITY STATUS OF THE USER DEVICE

315 — RECEIVING A REQUEST TO TRANSMIT INTERMEDIARY CONTENT TO THE USER DEVICE

320 — IN RESPONSE TO RECEIVING THE REQUEST TO TRANSMIT INTERMEDIARY CONTENT, DETERMINING THAT THE ACTIVITY STATUS OF THE USER DEVICE IN THE USER MAP IS AN ACTIVE STATUS OR AN INACTIVE STATUS

ACTIVE

INACTIVE

325 — TRANSMITTING A SET OF CACHED INTERMEDIARY CONTENT TO THE USER DEVICE

330 — DETERMINING, BY THE CONTENT DECISION SYSTEM, TO WITHHOLD TRANSMISSION OF THE SET OF CACHED INTERMEDIARY CONTENT

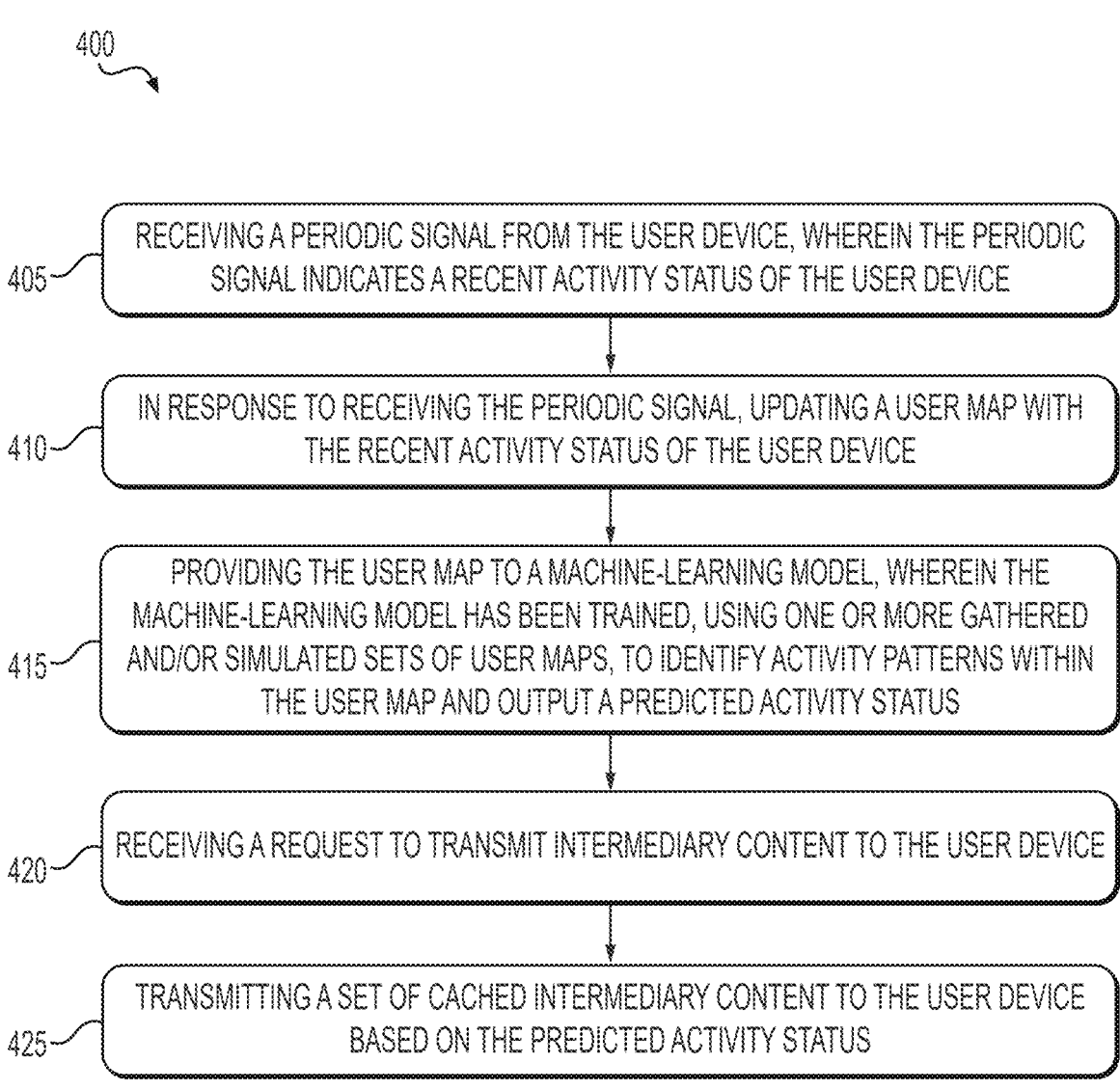

400

405 — RECEIVING A PERIODIC SIGNAL FROM THE USER DEVICE, WHEREIN THE PERIODIC SIGNAL INDICATES A RECENT ACTIVITY STATUS OF THE USER DEVICE

410 — IN RESPONSE TO RECEIVING THE PERIODIC SIGNAL, UPDATING A USER MAP WITH THE RECENT ACTIVITY STATUS OF THE USER DEVICE

415 — PROVIDING THE USER MAP TO A MACHINE-LEARNING MODEL, WHEREIN THE MACHINE-LEARNING MODEL HAS BEEN TRAINED, USING ONE OR MORE GATHERED AND/OR SIMULATED SETS OF USER MAPS, TO IDENTIFY ACTIVITY PATTERNS WITHIN THE USER MAP AND OUTPUT A PREDICTED ACTIVITY STATUS

420 — RECEIVING A REQUEST TO TRANSMIT INTERMEDIARY CONTENT TO THE USER DEVICE

425 — TRANSMITTING A SET OF CACHED INTERMEDIARY CONTENT TO THE USER DEVICE BASED ON THE PREDICTED ACTIVITY STATUS

*FIG. 4*

SYSTEMS AND METHODS FOR PREFETCHING AND TRANSMITTING INTERMEDIARY CONTENT TO USER DEVICES

CROSS-REFERENCE TO RELATED APPLICATION(S)

This application claims the benefit of priority to Indian Provisional Patent Application No. 202411002357, filed Jan. 12, 2024, the entirety of which is incorporated by reference herein.

TECHNICAL FIELD

Various embodiments of this disclosure relate generally to the field of multimedia content streaming and, more particularly, to systems and methods for prefetching and transmitting intermediary content to user devices.

BACKGROUND

Server-side advertisement insertion ("SSAI") or dynamic ad insertion ("DAI") enables advertising entities to transmit ads selected for each user based on user preferences, demographics, or other factors or interests the entity knows about each unique user. For example, custom or semi-custom advertisements may be transmitted to user devices for display on the users' devices, in-line with the content the user is streaming to their device. Server-side ad insertion combines manifest manipulation (e.g., stitching), ad pod fetching from an ad content server, content and ad bitrate normalization, resolution normalization, and the like. Therefore, each action occurs on the server side before a manifest (i.e., data/video stream) is sent to a user device.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for prefetching and transmitting intermediary content to a user device.

In one aspect, an exemplary embodiment of a method of transmitting intermediary content to a user device may include receiving a periodic signal from the user device. The periodic signal may indicate an activity status of the user device. In response to receiving the periodic signal, the method may further include updating a user map with the activity status of the user device. The method may further include receiving a request to transmit intermediary content to the user device. In response to receiving the request to transmit intermediary content, the method may further include determining that the activity status of the user device in the user map is an active status. The method may further include transmitting a set of cached intermediary content to the user device.

In another aspect, an exemplary embodiment of a method of transmitting intermediary content to a user device may include receiving a periodic signal from the user device. The periodic signal may indicate a recent activity status of the user device. In response to receiving the periodic signal, the method may further include updating a user map with the recent activity status of the user device. The method may further include providing the user map to a machine-learning model. The machine-learning model may have been trained, using one or more gathered and/or simulated sets of user maps, to identify activity patterns within the user map and output a predicted activity status. The method may further include receiving a request to transmit intermediary content to the user device. The method may further include transmitting a set of cached intermediary content to the user device based on the predicted activity status.

In a further aspect, an exemplary embodiment of a system for transmitting intermediary content to a user device may include a memory storing instructions and one or more processors operatively connected to the memory and configured to execute the instructions to perform operations. The operations may include receiving a periodic signal from the user device. The periodic signal may indicate an activity status of the user device. In response to receiving the periodic signal, the operations may further include updating a user map with the activity status of the user device. The operations may further include receiving a request to transmit intermediary content to the user device. In response to receiving the request to transmit intermediary content, the operations may further include determining that the activity status of the user device in the user map is an active status. The operations may further include transmitting a set of cached intermediary content to the user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart of an exemplary method of prefetching and transmitting intermediary content to a user device, according to one or more embodiments.

FIG. 4 depicts a flowchart of another exemplary method of prefetching and transmitting intermediary content to a user device, according to one or more embodiments.

DETAILED DESCRIPTION OF EMBODIMENTS

Figure 1:
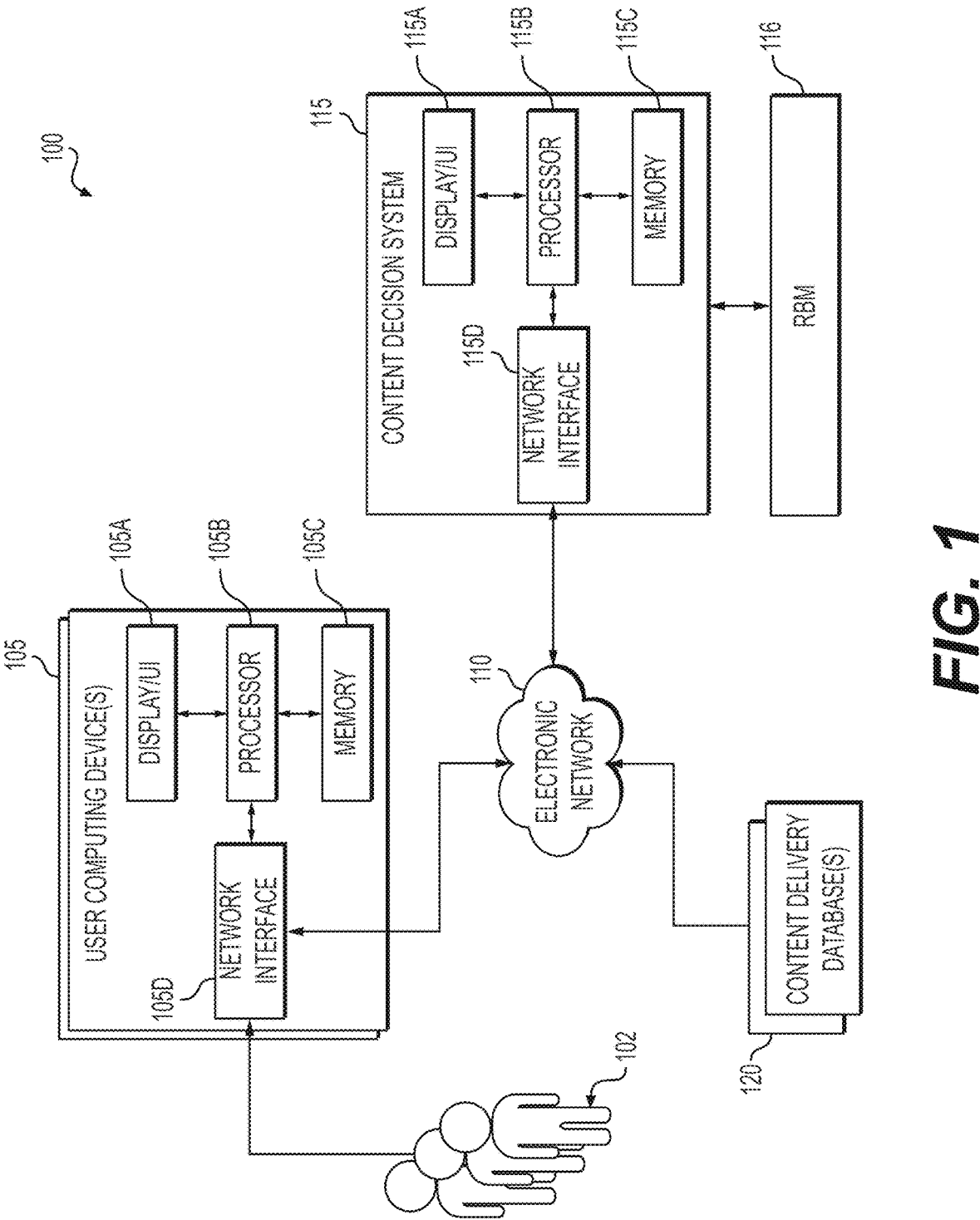
FIG. 1 depicts an exemplary network environment for prefetching and transmitting intermediary content to a user device, according to one or more embodiments.

According to certain aspects of the disclosure, methods and systems are disclosed for prefetching and transmitting intermediary content to a user device. In cases where a large number of users (e.g., viewers, subscribers) are watching a live streaming event (e.g., a sports event) or video on demand (VOD) (e.g., the final season of a series), there are unique challenges for SSAI in attempting to handle millions of concurrent requests for intermediary content (e.g., advertisements). Because each unique user must be served an ad break simultaneously or nearly simultaneously, it can be challenging to process a very large number of requests for intermediary content in a very short time span (e.g., in milliseconds). For example, a sudden influx of millions of requests for intermediary content may present unique challenges. In the event of an unexpectedly high volume of requests, components of an existing system may be limited, resulting in empty ad slots and lost revenue for the video service provider and/or advertising entity. Additionally, because an ad break would start and end for all connected (e.g., active) users at about the same time, existing components would also have a limited time (e.g., less than 5 seconds) within which to fetch multiple ads, stitch them with the content, and serve them to the users.

Such issues with serving suitable ads at these times can create a suboptimal experience for users or viewers, and can reduce the ability of advertisers to effectively reach their intended audience at the intended times. Therefore, improved systems and methods for prefetching and transmitting intermediary content are provided. Specifically, a content decision system is described herein that is configured for handling the very large number of concurrent requests for intermediary content.

In addition, a machine-learning model and related computer systems are disclosed for determining associations between user activity data and user maps (e.g., of multiple users) to identify (e.g., determine and/or predict) activity patterns. A user's activity data, such as account history, recent and/or current activity status, or that of other users may be used to determine activity patterns. Advertising entities and/or video service providers may therefore target their intermediary content (e.g., ads) more effectively and efficiently, e.g., in ways that may conserve computational and other resources, including providing a scalable solution that may handle a large number of concurrent requests for intermediary content.

As will be discussed in more detail below, in various embodiments, systems and methods are described for using machine-learning to determine whether intermediary content should be transmitted to a user device. By training a machine-learning model (e.g., via supervised or semi-supervised learning) to learn associations between user activity data and one or more user maps, the trained machine-learning model may identify useful user activity patterns. The machine-learning model may output a predicted activity status. In some examples, the predicted activity status may indicate whether a user and/or user device is anticipated (e.g., predicted) to be active upon transmission of intermediary content. In this way, given a large set of user devices to which intermediary content may be transmitted and the cost of resources associated with transmitting the intermediary content, machine-learning may be used to optimize, e.g., maximize, the finite resources of an entity, and to efficiently provide relevant intermediary content to a very large number of unique users simultaneously or almost simultaneously.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVOD) services such as television shows, films, documentaries, games, and the like. The term "user" may be used interchangeably with "user profile," "profile," and the like throughout this application. The phrase "linking users" may be used interchangeably with "linking user profiles" and the like throughout this application. The phrase "registered with" may be used interchangeably with "subscribed to" and the like throughout this application. The phrase "multimedia content" or "media content" may be used interchangeably with "multimedia content item" and the like throughout this application.

As used herein, "intermediary content" may generally encompass audio, video, and/or audio-video multimedia content or other consumable content that is intermediary to a digital content stream, such as advertisements, commercials, an ad break, interactive content, survey, game, or the like. Intermediary content may also include any content that is configured to be stitched into a manifest or content stream sent to a user device.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a machine-learning algorithm may be configured to train a machine-learning model by modifying one or more of a weight, a layer, a node, and/or a synapse of the machine-learning model such that the machine-learning model may be configured to identify activity patterns within a user map and output a predicted activity status of the users of any given service, such as a video-on-demand streaming service.

In another exemplary use case, if the predicted activity status is an active status, a set of cached intermediary content (e.g., ads) may be transmitted to the user device. If the predicted activity status is an inactive status, the transmission of the set of cached intermediary content may be withheld.

In another exemplary use case, a very large number of concurrent users (e.g., greater than one million) may be streaming content from a video service provider. Instead of fetching a set of intermediary content in response to all of the concurrent requests for ads, sets of intermediary content relevant to each user may be prefetched and cached according to a predetermined schedule. Thereafter, a content decision system may determine if the activity status of the user device of each user is an active status or an inactive status. If the activity status is an active status, a set of cached intermediary content (e.g., ads) may be transmitted to the user device. If the activity status is an inactive status, the transmission of the set of cached intermediary content may be withheld. In this way, intermediary content may be delivered to only those user devices that are still connected to the video streaming service, or are otherwise still active.

In another exemplary use case, a periodic signal (e.g., a heartbeat) from a user device may be received by a content decision system. The periodic signal from the user device may indicate an activity status of the user device (e.g., active or inactive). The periodic signal may be transmitted by the user device at a regular interval (e.g., every 5 minutes), or it may be transmitted when the activity status changes (e.g., active to inactive when a user disconnects from the streaming content or service). Each user device of a large number of user devices streaming content may each transmit a periodic signal to the content decision system. One or more user maps may be updated with each activity status of each unique user device. The user map may then be accessed by the content decision system to determine whether to transmit intermediary content to each unique user device based on each unique activity status.

In another exemplary use case, the user map may not have an activity status recorded and/or updated for a particular user device. In this case, the content decision system may determine to fetch and transmit a set of intermediary content (e.g., just in time).

In another exemplary use case, the intermediary content may be configured to be stitched into a content stream being transmitted to a user device by a web server (e.g., stitched into an ad break within a streaming video transmitted by a content server). In a case where the intermediary content is cached, the intermediary content may have been prefetched from a content server according to a schedule (e.g., when the user connects to the streaming service, e.g., 1-3 minutes before the ad break, a few seconds before the ad break, or the like). In other examples, the intermediary content may be associated with (e.g., relevant to) a unique user profile and/or user device.

While the examples above involve components and aspects of a content decision system and transmitting intermediary content, it should be understood that techniques according to this disclosure may be adapted to any suitable type of service or system providing content, such as messaging, games, short video clips, or the like. It should also be understood that the examples herein are illustrative only. The techniques and technologies of this disclosure may be adapted to any suitable activity.

Presented below are also various aspects of machine-learning techniques that may be adapted to pre-fetching and transmitting intermediary content. As will be discussed in more detail below, machine-learning techniques adapted to pre-fetching and transmitting intermediary content, may include one or more aspects according to this disclosure, e.g., finding associations between a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

FIG. 1 is a diagram depicting an exemplary system infrastructure 100 for transmitting intermediary content to a user device, according to one or more embodiments of the present disclosure. The system infrastructure 100 may include one or more user devices 105 operated by users 102, an electronic network 110, a content decision system 115, and one or more content delivery databases 120. One of skill in the art would recognize that the content decision system 115 may configure the one or more user devices 105 so as to experience different functionalities (e.g., video/audio streaming) and/or have access to different information (e.g., determined by credentials such as user ID/password).

The user devices 105, the content decision system 115, and/or the content delivery databases 120 may be connected to each other or in communication with each other via electronic network 110, such as "the Internet," using one or more standard communication protocols (e.g., HTTP/IP). The content decision system 115 may be configured to receive data over the electronic network 110 from the user devices 105, including, but not limited to, a periodic signal (e.g. a heartbeat signal), an activity status of the user device, requests to transmit intermediary content, sets of intermediary content, and the like. The content decision system 115 may receive a unique periodic signal from each of a large number of unique user devices (e.g., user devices 105). The content decision system 115 may also transmit requests to fetch or prefetch intermediary content over the electronic network 110, as well as streaming content. In this way, the content decision system 115 may administrate or facilitate the scheduling of fetching intermediary content, while RBM 116 may prefetch the intermediary content. The content decision system 115 may also receive or access user profile information that may be stored on user devices 105 and/or other components of the system. The content decision system 115 may also update, write to, store and/or read or access a user map that includes one or more activity statuses of one or more user devices 105. In various implementations, the content decision system 115 may determine to transmit or withhold transmission of intermediary content based on the data included within the user map, or the like.

In one or more embodiments, the content decision system 115 and the content delivery database 120 may each be embodied in one web server and one database system, respectively. Alternatively, in one or more embodiments, the content decision system 115 may be a server cluster, or any other collection or network of a plurality of computer servers. The content delivery database 120 also may be a collection of a plurality of interconnected databases or a data store. The content decision system 115 and the content delivery database 120 may be components of one server system. Additionally, or alternatively, the content decision system 115 and the content delivery database 120 may be components of different server systems, with the electronic network 110 serving as the communication channel between them. The content decision system 115 and the content delivery database 120 may be associated with an entity, such as a subscription-based streaming service provider and/or an advertiser (not shown). In some embodiments, the content decision system 115 and the content delivery database 120 may collectively be referred to as an entity system.

As shown in FIG. 1, the content decision system 115 may be in communication with the user devices 105 to transmit and receive messages and/or signals from each other across the network 110. The user devices 105 may be associated with users who are subscribed to a streaming service platform operated by the content decision system 115. In one embodiment, the content decision system 110 may be operated as a service, for a content delivery database 120 operated by another entity. Moreover, one or both of content decision system 115 and content delivery database 120 may be executed in a distributed "cloud"-based server environment.

The electronic network 110 may comprise one or more networks that connect devices and/or components of environment 100 to allow communication between the devices and/or components. For example, as described above the electronic network 110 may be implemented as the Internet, accessed by a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the electronic network 110 may be implemented using cell and/or pager networks, satellite, licensed radio, or a combination of licensed and unlicensed radio. The electronic network 110 may be associated with a cloud platform that stores data and information related to methods disclosed herein.

The user device(s) 105 may include a display/user interface (UI) 105A, a processor 105B, a memory 105C, and/or a network interface 105D. The user device(s) 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user device(s) 105 may execute, by the processor 105B, an operating system (O/S) and at least one application (each stored in memory 105C). The application may be a browser program or a mobile application program (which may also be a browser program in a mobile O/S). The application may generate one or more interactive graphic user interfaces (GUIs), based on instructions/information received from the content decision system 115. In examples, the intermediary content may be interactive. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The content decision system 115 may include a display/UI 115A, a processor 115B, a memory 115C, and/or a network interface 115D. The content decision system 115 may be a computer, system of computers (e.g., server(s)), and/or or a cloud service computer system. The content decision system 115 may execute, by the processor 115B, an operating system (O/S) and at least one instance of a program (each stored in memory 115C). The content decision system 115 may store or have access to information from content delivery database(s) 120. The display/UI 115A may be a touch screen or a display with other input systems (e.g., mouse, keyboard, etc.) for an operator of the content decision system 115 to control the functions of the content decision system 115 (e.g., to update and/or maintain the system). The network interface 115D may be a TCP/IP network interface for, e.g., Ethernet or wireless communications with the network 110. Additionally, content decision system 115 may include software components or modules that will be described in greater detail below, with respect to FIG. 2.

In the environment 100, the content decision system 115 may retrieve multimedia content requested by users from the content delivery database(s) 120 to enable requested content to be streamed by users on the user device(s) 105. Additionally, the content decision system 115 may retrieve intermediary content (e.g., cached intermediary content) from the content delivery database(s) 120, and/or from separate stores of advertising content or other intermediary content. In one embodiment, the content delivery database(s) 120 may store large volumes of intermediary content (e.g., advertisements), as well as multimedia content items, including, for example, video series, movies, documentaries, and additional programming content that may be streamed by users 102 on the user device(s) 105. In some embodiments, the content delivery database(s) 120 may be maintained by third party content providers (e.g., an advertising entity). In other embodiments, the content delivery database(s) 120 may be maintained by the content decision system 115 and/or video service provider.

Figure 2:
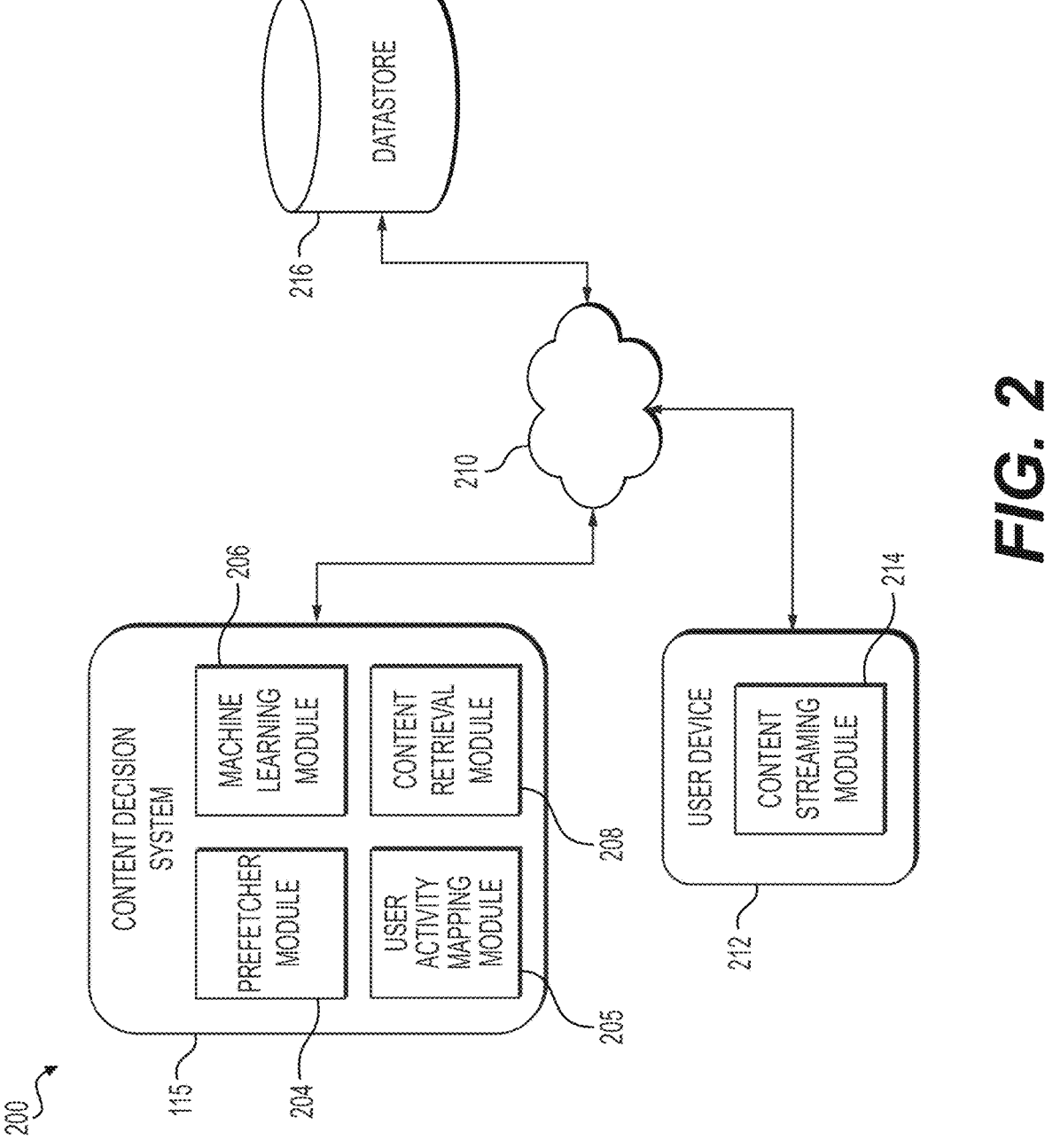
FIG. 2 depicts an exemplary system architecture, including a content decision system, for prefetching and transmitting intermediary content to a user device.

FIG. 2 depicts an exemplary system 200 that may be utilized with techniques presented herein. One or more user device(s) 212 may communicate across an electronic network 210. As will be discussed in further detail below, one or more content decision system(s) 115 may communicate with one or more of the other components of the system 200, e.g., one or more user devices 212, across electronic network 210 (which may be the electronic network 110 described above). As described above with respect to user devices 105, the one or more user device(s) 212 may be associated with a user, e.g., a subscriber, a user associated with the user device(s) 212, a user associated with the content decision system 115, and/or a user associated with one or more of generating, training, or tuning a machine-learning model for transmitting intermediary content. As described, the one or more user device(s) 212 may be associated with one or more users, and may be configured to transmit, by one or more processors of the user device(s) 212, a periodic signal. The one or more user device(s) 212 may also be configured to receive intermediary content and display and/or output the intermediary content (e.g., by a user interface, display, or the like).

In some embodiments, one or more of the components of the system 200 are associated with a common entity, e.g., a video service provider, an advertising entity, a user system, or the like. In some embodiments, one or more of the components of the system may be associated with a different entity than another. In one example, user device 212 may be associated with a user (e.g., a subscriber), while content decision system 115 and a data store 216 may be associated with a video service provider (e.g., an entertainment provider/entity). In other embodiments, data store 216 may be associated with a third-party that provides data storage services to an entity associated with content decision system 115. The systems and devices of the system 200 may communicate in any arrangement. As will be discussed herein, systems and/or devices of the system 200 may communicate in order to one or more of generate, train, or use a machine-learning model to identify activity patterns to transmit intermediary content, among other activities.

The user device(s) 212 may be configured to enable a user to access and/or interact with other systems in the system 200. For example, the user device(s) 212 may be a computer system such as, for example, a desktop computer, a mobile device, a tablet, etc. In some embodiments, the user device(s) 212 may include one or more electronic application(s), e.g., a program, interface, plugin, browser extension, mobile application, etc., installed on a memory of the user device(s) 212. In some embodiments, the electronic application(s) may be associated with one or more of the other components in the system 200. For example, the electronic application(s) may include one or more of a mobile application, program, interface, browser extension, software module, etc., associated with content decision system 115.

The user device(s) 212 may include a content streaming module 214. Content streaming module 214 may include a program, application, interface, plugin, browser extension, software module, or the like. Content streaming module 214 may stream and/or display, using one or more processors of the user device(s) 212, multimedia content (e.g., movies, shows, videos, and the like). Content streaming module 214 may be configured to translate packets of data transmitted over a network to video and/or audio output, or the like. The multimedia content may be streamed via electronic network 210 from one or more multimedia content servers. In examples, the multimedia content server may be associated with a separate entity than the content decision system, or may be associated with the same entity. In various implementations, content streaming module 214 may be configured to stitch intermediary content with the multimedia content to be streamed and/or displayed using one or more processors of the user device(s) 212.

In various embodiments, the system 200 may include a data store 216. The data store 216 may include a server system and/or a data storage system such as computer-readable memory such as a hard drive, flash drive, disk, etc. In some embodiments, the data store 216 includes and/or interacts with an application programming interface for exchanging data to other systems, e.g., one or more of the other components of the environment. In examples, data store 216 may store data or information of other components of the system 200, such as the input and/or output of a machine-learning model, as described in more detail below, as well as the user map updated by content decision system 115, user profile data, and the like. Data store 216 may also store log data related to user device(s) 212, content streaming module 214, and/or content decision system 115.

In various embodiments, the electronic network 210 may be a wide area network ("WAN"), a local area network ("LAN"), personal area network ("PAN"), or the like. In some embodiments, electronic network 210 includes the Internet, and information and data provided between various systems occurs online (e.g., via a web server). "Online" may refer to connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As depicted in FIG. 2, in one embodiment, content decision system(s) 115 may include a prefetcher module 204, a user activity mapping module 205, a machine learning module 206, and a content retrieval module 208. In exemplary embodiments, and within the context of content decision system 115, prefetcher module 204 may be configured to "fetch" (e.g., retrieve, access, or the like) intermediary content from a multimedia content server. The intermediary content may be fetched according to a predetermined schedule. In examples, the intermediary content may be fetched before a request to transmit intermediary content to user device 212 is received by content decision system 115, or another component of the system 200. This may be done to reduce latency in the multimedia content stream. In examples, the intermediary content may be fetched, for example, 5-15 seconds before the request is received, 3-5 minutes before the request is received, or at any other suitable interval. The prefetched intermediary content may be stored in a cached memory. The cache, or cached memory, may be stored local to or remote to the content decision system 115, prefetcher module 204, and/or system 200. The cached memory may also be stored using data store 216. In this case, prefetcher module 204 may retrieve or request (e.g., prefetch) intermediary content from an ad server (not shown), and the prefetched intermediary content may be stored within data store 216, having been transmitted to data store 216 from the ad server via electronic network 210, or another electronic network. In some examples, prefetcher module 204 may be implemented as one or more processors of content decision system 115, as a software module, or the like.

As described above and shown in FIG. 2, content decision system(s) 115 may also include user activity mapping module 205. In various embodiments, user activity mapping module 205 may be configured to receive a periodic signal from user device(s) 212. The periodic signal may be a heartbeat, referring to a signal that indicates the availability or activity status of any particular user device emitting the signal. According to the embodiments described herein, the periodic signal may indicate, identify, or otherwise be associated with an activity status of a user device, such as user device 212. The periodic signal received by content decision system 115, such as via user activity mapping module 205, may therefore indicate the connection status, power status, or other activity status of the user device 212. Further, in response to receiving the periodic signal, user activity mapping module 205 may update a user map with the received activity status of user device 212. In some examples, a record of activity statuses of a single user device, such as user device 212, may comprise a single user map specific to the user device. In other examples, one or more user maps may include a record of, or most recent, activity statuses of multiple user devices, such as a large number of user devices associated with a large number of subscribers.

As illustrated, content decisions system(s) 115 may also include content retrieval module 208. In various embodiments, content retrieval module 208 may be configured to receive a request to transmit intermediary content to user device(s) 212. In some examples, content retrieval module 208 may be capable of receiving a very large number (e.g., greater than 5 million) of concurrent or simultaneous requests from a very large number of user devices. Such requests to transmit intermediary content may be received by content retrieval module 208 at a time before the transmission is needed (e.g., 5 seconds before an ad break). Therefore, in order to handle the large amount of requests in a relatively short period of time, content retrieval module 208 may determine the activity status of any given user device (such as each of user device(s) 212) by accessing the stored user map(s). If the activity status for any given user device is an active status (e.g., connected, powered on, logged in, streaming multimedia content, or the like), content retrieval module 208 may then retrieve the cached intermediary content, such as from data store 216, to be transmitted to user device(s) 212. In some examples, a set of the cached intermediary content may be uniquely associated with a particular user, such that it may be relevant to the interests, behaviors, or activity of the particular user. In this way, the set of cached intermediary content that is transmitted to one user device 212 may be applicable to that unique user device, or a user of the user device.

As discussed in further detail below, the content decision system 115 may one or more of generate, store, train, or use a machine-learning model configured to find activity patterns in user device data and one or more user maps, and output a predicted activity status. The content decision system 115 may include a machine-learning model and/or instructions associated with the machine-learning model, e.g., instructions for generating a machine-learning model, training the machine-learning model, using the machine-learning model etc. The content decision system 115 may include instructions for retrieving, monitoring, and/or capturing activity data e.g., as input of the machine-learning model, and/or operating a display of the user device(s) 212 to provide output, e.g., as adjusted based on the machine-learning model. The content decision system 115 and/or data store 216 may include training data, e.g., activity data and one or more user maps, and may include ground truth, e.g., training data, to identify patterns in activity data and output a predicted activity status for a user device.

Content decision system(s) 115 may therefore include machine-learning module 206, as illustrated. In various embodiments, machine-learning module 206 includes a machine-learning model configured to learn and identify activity patterns in electronic device data to determine and output a predicted activity status for a user device. In examples, the machine-learning model may find associations within the data included in one or more user maps, such as a user device's changes in activity status over time, and/or how the user device's activity status is associated with other factors, such as available multimedia content to stream, time of day, user account use patterns, location data, user preferences, user behavior patterns, or the like. The machine-learning model may be trained using one or more gathered and/or simulated sets of user maps. For example, historical user device activity status data may be used to train the machine-learning model. The machine-learning model may also be retrained using the user maps and/or other data as described, and sets of the output predicted activity statuses.

In some embodiments, a system or device other than the content decision system(s) 115 is used to generate and/or train a machine-learning model. For example, such a system may include instructions for generating the machine-learning model, the training data and ground truth, and/or instructions for training the machine-learning model. A resulting trained-machine-learning model may then be provided to the content decision system(s) 115.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between user maps and user device activity status and/or to identify activity patterns within the user maps, such that the trained machine-learning model is configured to identify activity patterns and output a predicted activity status based on the learned associations. As used herein, the activity patterns may refer to the state or status of the user device, the location of the user device, the state or status of a user account associated with the user device, the state or status of the streaming of multimedia content on the user device, any of the described as recorded or stored in a user map, and the like.

In various embodiments, the variables of a machine-learning model may be interrelated in any suitable arrangement in order to generate the output. For example, in some embodiments, the machine-learning model may include content-processing architecture that is configured to identify, isolate, and/or extract features, geometry, and or structure in one or more of optical character recognition data and/or non-optical in vivo image data. For example, the machine-learning model may include one or more convolutional neural network ("CNN") configured to identify patterns in user device activity data, and may include further architecture, e.g., a connected layer, neural network, etc., configured to determine a relationship between the identified patterns in order to output a predicted activity status.

In some instances, different samples of training data and/or input data may not be independent. For example, samples of training data may include user device activity data captured from users that elect to be monitored and/or to provide such data for the gathering of such training data, simulated activity data, simulated or historical user device activity data, user maps, and the like. Thus, in some embodiments, the machine-learning model may be configured to account for and/or determine relationships between multiple samples, at times from multiple sources.

For example, in some embodiments, the machine-learning model of the content decision system 115 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of user device activity data and user maps as input, and generate a predicted activity status as output.

Although depicted as separate components in FIG. 2, it should be understood that a component or portion of a component of system 200 may, in some embodiments, be integrated with or incorporated into one or more other components. For example, a display may be integrated into the user device 212 or the like. In another example, the content decision system 115 may be integrated in a data storage system. The data storage system may be configured to communicate and/or receive/send data across electronic network 210 to other components of system 200. Further, content decision system 115 may be integrated or incorporated into a software module of user device(s) 212. In some embodiments, operations or aspects of one or more of the components discussed above may be distributed amongst one or more other components. Any suitable arrangement and/or integration of the various systems and devices of the system 200 may be used.

Further aspects of the machine-learning model and/or how it may be utilized are discussed in further detail in the methods below. In the following methods, various acts may be described as performed or executed by a component from FIG. 1 and/or FIG. 2, such as content decision system 115, the user device 212, or components thereof. However, it should be understood that in various embodiments, various components of the system 200 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 3 illustrates an exemplary method 300 of prefetching and transmitting intermediary content to a user device, such as in the various examples discussed herein. Specifically, FIG. 3 depicts an exemplary method 300 of determining whether to transmit cached intermediary content to users based on determining the activity status of those users. At step 305, method 300 may including receiving a periodic signal from the user device. The periodic signal may indicate an activity status of the user device (e.g., such as user device(s) 212, as depicted in FIG. 2). The periodic signal (e.g., heartbeat) may be transmitted using an electronic device associated with a unique user (e.g., such as user device(s) 212, as depicted in FIG. 2). Components of the electronic device, such as hardware or software components, one or more processors, or the like, may be used to transmit or emit the periodic signal. In examples, these components may be implemented as a content streaming module (e.g., such as content streaming module 214, as depicted in FIG.

2). In various implementations, the electronic device periodic signal may represent, indicate, or identify the activity status of the electronic device. The periodic signal may be transmitted by the user device at a regular interval (e.g., every 5 seconds, every 5 minutes, or the like). In other examples, the periodic signal may be transmitted by the user device based on a change to the activity status of the user device. For example, if the user device is active and then the device powers down or enters a "sleep" mode, or if a subscriber logs off of the video streaming platform, then the user device may transmit the periodic signal based on the change to the activity status of the user device.

In exemplary embodiments, the content decision system (e.g., such as content decision system 115, as depicted in FIG. 1 and FIG. 2) may receive a large number of periodic signals from a large number of user devices simultaneously, or almost simultaneously. Therefore, a unique periodic signal emitted or transmitted from each of the unique user devices may be received by the content decision system. In such examples, each unique periodic signal may indicate a unique activity status for each unique user device.

At step 310, in response to receiving the periodic signal, a user map may be updated with the activity status of the user device. The user map may be implemented as a map data structure, dictionary, associative array, hash map, tree map, linked hash map, trie map, bloom filter map, or the like. In examples, the user map may be configured to store multiple key-value pairs, where each key is associated with a value. In such examples, a key may be a unique identifier associated with a unique user device or user account, and the value associated with the key in the user map may be an identifier associated with an active status, inactive status, or another indicator of activity status. In various embodiments, values stored within the user map may be updated or overwritten with new values, such as when the periodic signal is received by the content decision system indicating a different activity status. In other examples, the values associated with the activity statuses stored within the user map may be updated or overwritten each time the periodic signal is received by the content decision system, regardless of whether or not there was a change to the activity status. In still other examples, a time stamp may be associated with the key in the user map, indicating a time at which the periodic signal was received, a time at which the activity status changed, a time at which the user map was updated based on the periodic signal, or the like. In various embodiments, the user map may be stored in a data store (e.g., data store 216, as depicted in FIG. 2), and may be accessed by content decision system, or any of its components, via an electronic network (e.g., electronic network 210, as depicted in FIG. 2).

At step 315, a request to transmit intermediary content to the user device (e.g., such as user device(s) 212, as depicted in FIG. 2) may be received. The request to transmit intermediary content may be received by the content decision system, or by a component of content decision system (e.g., content retrieval module 208, as depicted in FIG. 2). The request to transmit intermediary content may trigger the transmission of a request to retrieve cached (e.g., prefetched) intermediary content from a content delivery database (e.g., content delivery database 120, as depicted in FIG. 1), a content server (e.g., a web server), or the like. In the case that intermediary content has not been prefetched, however, the request to transmit intermediary content may trigger the fetching of intermediary content. In examples, the intermediary content may be a collection (e.g., set) of advertisements configured to be stitched together with multimedia content (e.g., as part of a content stream being transmitted to a user device by a web server).

In various embodiments, the set of cached intermediary content may have been prefetched from a content server according to a predetermined, or preset, schedule or lead time. For example, intermediary content may be fetched from the content server prior to a request to transmit the intermediary content so that the intermediary content may be cached. It is contemplated that the intermediary content may be fetched at any number of times during the disclosed process, such as prior to receiving the periodic signal from the user device, a certain amount of time before a request to transmit the intermediary content, just in time and in response to the request to transmit the intermediary content, or the like. Further, the intermediary content, whether cached or not, may be associated with a unique user profile, such that the intermediary content may be uniquely relevant to the user profile. The unique user profile may be associated with the user device.

At step 320, in response to receiving the request to transmit intermediary content, the activity status of the user device in the user map may be determined. The data in the user map may be accessed or retrieved. In examples, the activity status may be an active status or it may be an inactive status. If the activity status is an active status, then, at step 325, a set of cached intermediary content is transmitted to the user device. If the activity status is an inactive status, then, at step 330, it may be determined to withhold transmission of the set of cached intermediary content. In various embodiments, withholding transmission of the set of cached intermediary content, or intermediary content in general, in response to receiving a request to transmit intermediary content, may conserve computing resources as the intermediary content may not otherwise be viewed on a user device that is inactive. Therefore, in an example where the set of cached intermediary content is transmitted to a user device, the benefit of the transmission of the intermediary content, may be maximized or increased. As described above, in an example where there is no activity status associated with the user device in the user map, a set of intermediary content may be fetched from a content server in response to the request to transmit the intermediary content, and may be transmitted to the user device.

FIG. 4 illustrates another exemplary method of transmitting intermediary content to a user device, such as in the various examples discussed herein. At step 405, a periodic signal is received from a user device. The periodic signal may indicate a recent activity status of the user device. The recent activity status may be a current activity status or an activity status indicated by the most recent periodic signal received by the content decision system, or the like. In other implementations, the recent activity status may be associated with an activity status indicated by a past periodic signal received. At step 410, in response to receiving the periodic signal, a user map may be updated with the recent activity status of the user device. In various embodiments, the user map may have more than one value (e.g., activity status) associated with each key (e.g., unique identifier of a unique user device). Thus, the user map may indicate a history of activity statuses.

At step 415, the user map may be provided to a machine-learning model. In exemplary embodiments, the machine-learning model may have been trained, using one or more gathered and/or simulated sets of user maps and/or activity status data, to identify activity patterns within the user map and activity status data. In some examples, the machine-learning model may be trained to identify patterns in a history of activity statuses stored in the user map. The machine-learning model may output a predicted activity status. In a particular example, a unique user device may have been connected to a video streaming service on a majority of evenings at 7 PM over a period of time. After streaming one full movie, the user device may have become inactive. Therefore, at 7:30 PM, the predicted activity status output by the machine-learning model, based on the data provided to the machine-learning model, may be an active status. In another particular example, the transmission of the periodic signal from a user device may be interrupted or otherwise blocked, or not received by the content decision system. Therefore, the machine-learning model may be able to determine a predicted activity status within a certain degree of accuracy based on the most recently received periodic signal.

At step 420, a request to transmit intermediary content to the user device may be received by any of the means described herein. At step 425, a set of cached intermediary content may be transmitted to the user device based on the predicted activity status. In other examples, the transmission of the set of cached intermediary content may be withheld based on the predicted activity status. The set of cached intermediary content may be transmitted if the predicted activity status is an active status. Further, the set of cached intermediary content may be transmitted if the predicted activity status reflects a predicted active status. The predicted active status may be based on a threshold value or degree of accuracy.

Figure 5:
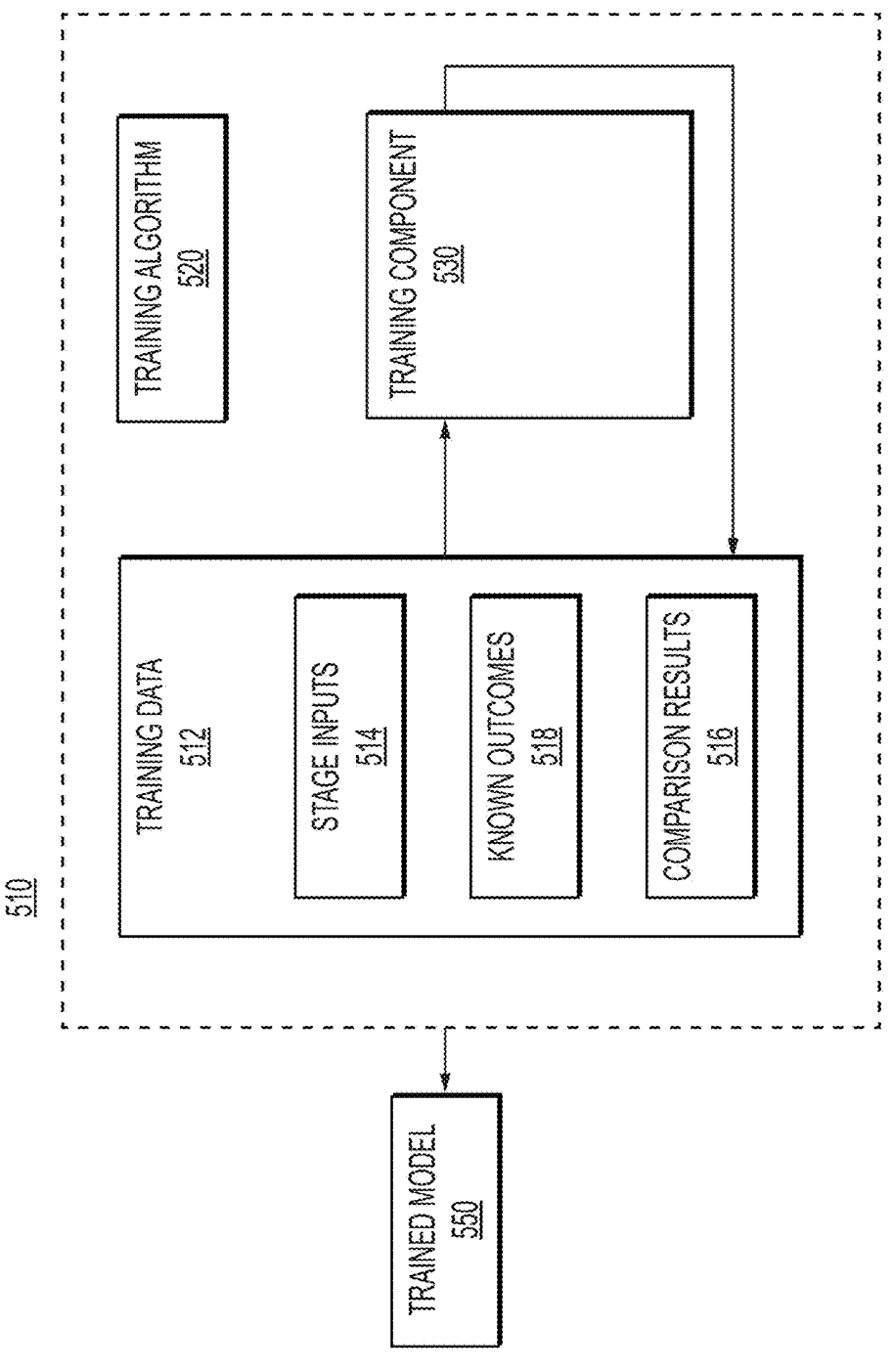
FIG. 5 depicts a flow diagram for training a machine-learning model for prefetching and transmitting intermediary content to a user device, according to one or more embodiments.

As disclosed herein, one or more implementations disclosed herein may be applied by using a machine-learning model. A machine-learning model as disclosed herein may be trained using one or more components or steps of FIGS. 1-4. As shown in flow diagram 510 of FIG. 5, training data 512 may include one or more of stage inputs 514 and known outcomes 518 related to a machine-learning model to be trained. The stage inputs 514 may be from any applicable source including a component or set shown in the figures provided herein. The known outcomes 518 may be included for machine-learning models generated based on supervised or semi-supervised training. An unsupervised machine-learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a trained machine-learning model 550. According to an implementation, the training component 530 may be provided comparison results 516 that compare a previous output of the corresponding machine-learning model to apply the previous result to re-train the machine-learning model. The comparison results 516 may be used by the training component 530 to update the corresponding machine-learning model. The training algorithm 520 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 510 may be a trained machine-learning model 550.

A machine-learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine-learning model (e.g., a trained model) based on the training. Once trained, the machine-learning model may output machine-learning model outputs in accordance with the subject matter disclosed herein. According to an implementation, one or more machine-learning models disclosed herein may continuously update based on feedback associated with use or implementation of the machine-learning model outputs.

It should be understood that embodiments in this disclosure are exemplary only, and that other embodiments may include various combinations of features from other embodiments, as well as additional or fewer features. For example, while some of the embodiments above pertain to multipartite relay, any suitable activity may be used.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 6:
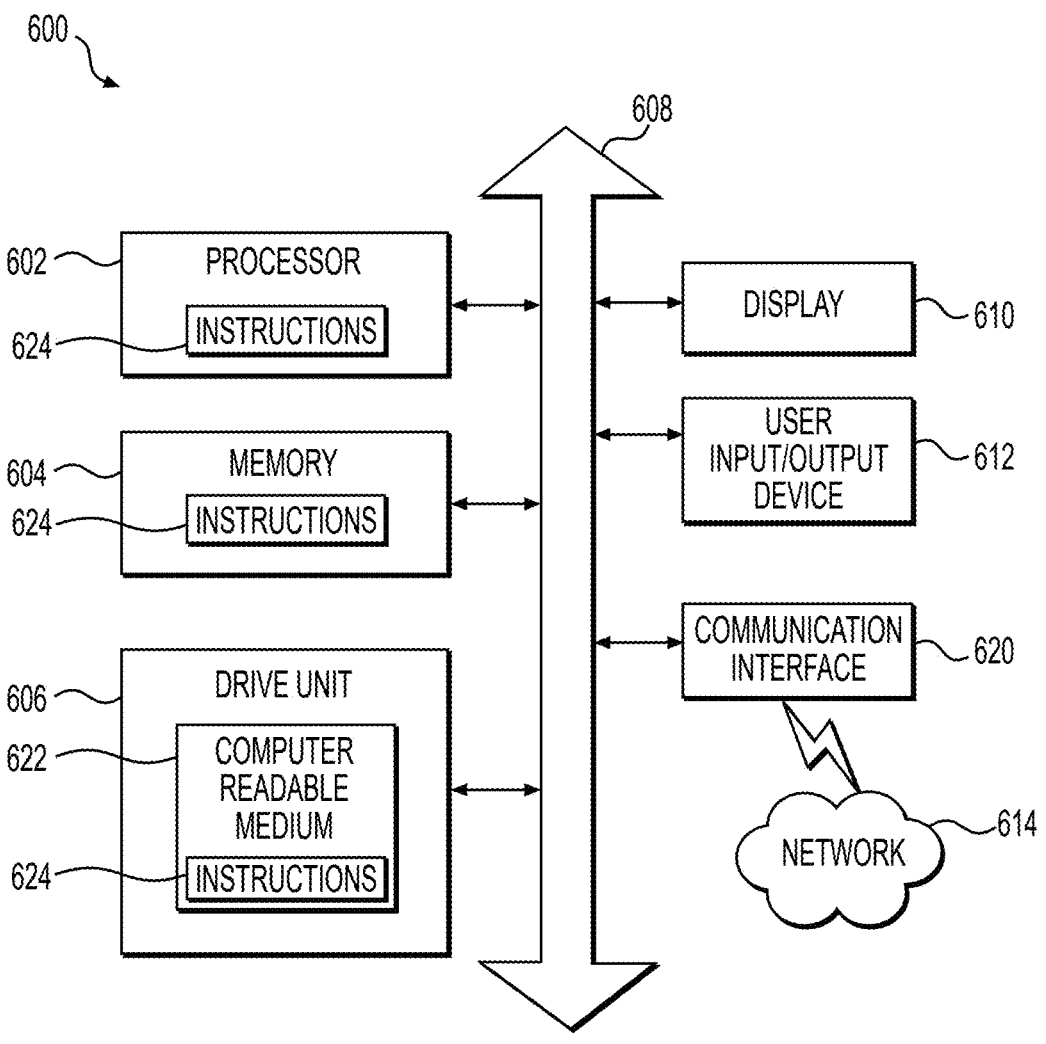
FIG. 6 depicts an example of a computing device for prefetching and transmitting intermediary content to a user device, according to one or more embodiments.

FIG. 6 is a simplified functional block diagram of a computer 600 that may be configured as a device for executing the methods disclosed here, according to exemplary embodiments of the present disclosure. For example, the computer 600 may be configured as a system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of transmitting intermediary content to a user device, the method comprising:
   receiving, by a content decision system, a periodic signal from the user device, wherein the periodic signal indicates a recent activity status of the user device;
   in response to receiving the periodic signal, updating, by the content decision system, a user map with the recent activity status of the user device;
   receiving, by the content decision system, a request to transmit intermediary content to the user device;
   in response to receiving the request to transmit intermediary content, determining, by the content decision system, that a current activity status of the user device is unassociated with the user map;
   fetching, from a content server, a set of intermediary content; and
   transmitting the set of intermediary content to the user device.

2. The computer-implemented method of claim 1, wherein the periodic signal is transmitted by the user device at a regular interval.

3. The computer-implemented method of claim 1, wherein the periodic signal is transmitted by the user device based on a change to the recent activity status of the user device.

4. The computer-implemented method of claim 1, further comprising:
   receiving, by the content decision system, a unique periodic signal from each of a plurality of unique user devices, wherein each unique periodic signal indicates an activity status of each unique user device of the plurality of unique user devices; and
   in response to receiving each unique periodic signal from each unique user device, updating, by the content decision system, the user map with the activity status of each unique user device.

5. The computer-implemented method of claim 1, further comprising:
   in response to receiving the request to transmit intermediary content, determining, by the content decision system, that the recent activity status of the user device in the user map is an inactive status; and determining, by the content decision system, to withhold transmission of a set of cached intermediary content.

6. The computer-implemented method of claim 1, wherein the set of intermediary content is configured to be stitched into a content stream, wherein the content stream is transmitted to the user device by a web server.

7. The computer-implemented method of claim 1, wherein the set of intermediary content has been prefetched from the content server according to a predetermined schedule.

8. The computer-implemented method of claim 1, wherein the set of intermediary content is associated with a unique user profile, and wherein the unique user profile is associated with the user device.

9. The computer-implemented method of claim 1, further comprising:

providing, by one or more processors, the user map to a machine-learning model, wherein the machine-learning model has been trained, using one or more gathered and/or simulated sets of user maps, to identify activity patterns within the user map and output a predicted activity status;

receiving, by the content decision system, the request to transmit intermediary content to the user device; and transmitting the set of intermediary content to the user device based on the predicted activity status.

10. A computer-implemented method of transmitting intermediary content to a user device, the method comprising:

receiving, by a content decision system, a periodic signal from the user device, wherein the periodic signal indicates a recent activity status of the user device;

in response to receiving the periodic signal, updating, by the content decision system, a user map with the recent activity status of the user device;

providing, by one or more processors, the user map to a machine-learning model, wherein the machine-learning model has been trained, using one or more gathered and/or simulated sets of user maps, to identify activity patterns within the user map and output a predicted activity status;

receiving, by the content decision system, a request to transmit intermediary content to the user device; and in response to receiving the request to transmit intermediary content, determining, by the content decision system, to withhold transmission of a set of cached intermediary content to the user device based on the predicted activity status.

11. The computer-implemented method of claim 10, wherein the periodic signal is transmitted by the user device at a regular interval.

12. The computer-implemented method of claim 10, wherein the set of cached intermediary content is configured to be stitched into a content stream, wherein the content stream is transmitted to the user device by a web server.

13. The computer-implemented method of claim 10, wherein the set of cached intermediary content has been prefetched from a content server according to a predetermined schedule.

14. The computer-implemented method of claim 10, wherein the set of cached intermediary content is associated with a unique user profile, and wherein the unique user profile is associated with the user device.

15. A system for transmitting intermediary content to a user device, the system comprising:

a memory storing instructions; and one or more processors operatively connected to the memory and configured to execute the instructions to perform operations including:

receiving, by a content decision system, a periodic signal from the user device, wherein the periodic signal indicates a recent activity status of the user device;

in response to receiving the periodic signal, updating, by the content decision system, a user map with the recent activity status of the user device;

receiving, by the content decision system, a request to transmit intermediary content to the user device;

in response to receiving the request to transmit intermediary content, determining, by the content decision system, that a current activity status of the user device is unassociated with the user map;

fetching, from a content server, a set of intermediary content; and transmitting the set of intermediary content to the user device.

16. The system of claim 15, wherein the periodic signal is transmitted by the user device at a regular interval.

17. The system of claim 15, wherein the periodic signal is transmitted by the user device based on a change to the recent activity status of the user device.

18. The system of claim 15, wherein the operations further include:

receiving, by the content decision system, a unique periodic signal from each of a plurality of unique user devices, wherein each unique periodic signal indicates an activity status of each unique user device of the plurality of unique user devices; and in response to receiving each unique periodic signal from each unique user device, updating, by the content decision system, the user map with the activity status of each unique user device.

\* \* \* \* \*